Jan. 7, 1941. A. SZABO 2,227,560

SHOCK ABSORBER BUMPER

Filed Oct. 14, 1939

Inventor
Alexander Szabo
By Carl Miller
Attorney

Patented Jan. 7, 1941

2,227,560

UNITED STATES PATENT OFFICE 2,227,560

SHOCK ABSORBER BUMPER

Alexander Szabo, Gary, Ind.

Application October 14, 1939, Serial No. 299,505

2 Claims. (Cl. 293—55)

This invention relates to bumpers such as are commonly used on motor vehicles.

The object of this invention is to provide a shock absorber mounting for the bumper such as to oppose a suitable resilient resistance to a sudden force applied to the bumper and in which the movable parts of the shock absorber are enclosed and protected.

Another object of this invention is to produce such a shock absorber mounting that is simple and cheap to manufacture, easy to install, efficient in operation and ornamental in appearance.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein.

Figure 2:
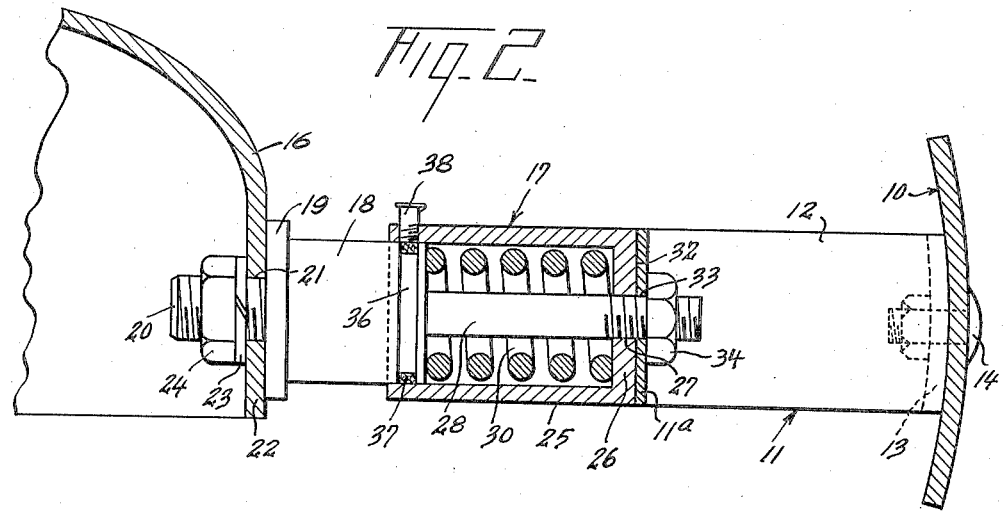
Figure 2 is a sectional view taken on line 2—2, Figure 1, showing details of shock absorber mounting.

Referring to the drawing, 10 denotes a bumper bar of any conventional size, form and design. To the rear of the bumper bar 10 are positioned a pair of leaf spring members 11 each provided with a pair of spring arms 12, 12a, the free ends of which are bent laterally outwardly as at 13, 13a to constitute attaching portions, each of which is secured to the bumper bar as by a bolt 14. Preferably the attaching spring arm portions 13a are each provided with a slot 15 through which the bolt 14 extends so as to permit relative sliding movement between the spring arms and the bumper bar upon impact thereon. A similar sliding connection may be provided at the other attaching portions, if so desired.

Between the intermediate portion 11a of each leaf spring member 11 and an adjacent chassis frame member 16 is disposed a shock absorber 17 which connects said spring members to the chassis frame members, in a manner to be hereinafter described.

Figure 1:
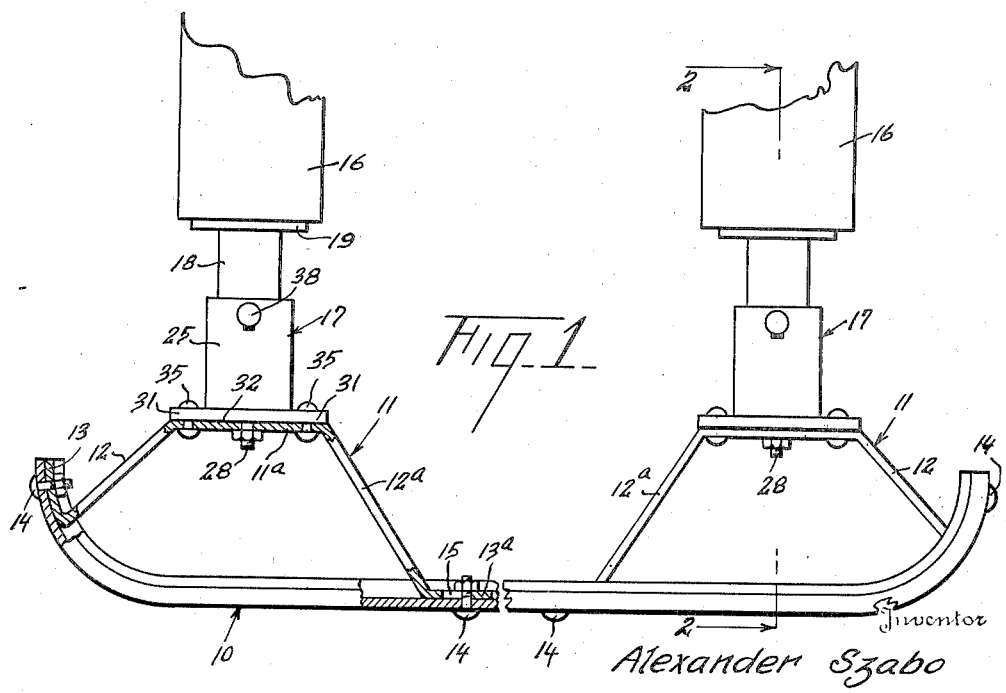
Figure 1 is a plan view of a bumper bar partly in section, showing shock absorber mounting at each end portion thereof.

Each shock absorber 17 comprises a solid cylindrical plunger 18 formed at one end with a wide radial seating flange 19 and an axial bolt extension 20 adapted to be inserted through an opening 21 in the end wall 22 of a chassis frame member 16 and rigidly locked in place by the lock washer 23 and nut 24. The plunger 18 is adapted for telescoping movement within a cylinder 25 which is open at one end to receive the plunger and closed at the other end by an integral wall 26. The cylinder end wall 26 is provided with a central opening 27 through which a guide bolt 28 is adapted to slidably project, said guide bolt forming an axial extension of the plunger 18 and being rigid therewith. Surrounding the guide bolt 28 and located wholly within the cylinder 25 is a compression coil spring 30. Formed on each side of the end wall 26 of the cylinder 25 and in diametric opposite relation are integral flanges 31 which along with the outer surface of the end wall 26 define a seat 32 for the intermediate portion 11a of the spring member 11. The intermediate portion 11a is provided with an opening 33 of the same size as the opening 27 through which the guide bolt 28 projects. A nut 34 threadedly mounted on the guide bolt 28 serves therewith as a means for adjusting the compression of the coil spring 30. The intermediate portion 11a of the leaf spring member 11 is rigidly secured to the cylinder seat 32 by means of rivets or bolts 35, as clearly shown in Figure 1.

In order to insure proper lubrication of the plunger and cylinder there is provided in the plunger 18 adjacent the inner terminal end 18a thereof, a peripheral groove 36 in which is placed a lubricant absorbent packing 37. An oil cup or nipple 38 is mounted on the cylinder 25 in registry with the plunger groove 36 to supply lubricant thereto as clearly shown in Figure 2.

It is obvious that it is the intention to so construct the shock absorber that it may be applied to existing vehicles at small expense.

Having thus described my invention, I claim as new and desire to secure by Letters Patent:

1. A shock absorber mounting for a vehicle bumper comprising a plunger member, means attaching the same to a supporting chassis frame member, a cylinder closed by a wall at one end telescopically mounted on said plunger, resilient means within said cylinder bearing on said plunger and said cylinder end wall opposite thereto, a guide and adjusting bolt formed integral with said plunger and projecting through an opening in said cylinder end wall whereby to adjust the compression of said resilient means, and means attaching a bumper to said cylinder end wall in spaced relation thereto, said plunger being formed at its outer end with an integral wide radial seating flange, an attaching bolt formed integral with said plunger at its outer end and adapted to be inserted through an opening in said chassis frame member for rigidly clamping the seating flange of said plunger thereto to provide said plunger attaching means, said plunger at its inner end portion being provided with a peripheral groove adapted to be covered by said cylinder in all positions thereof, a lubricant absorbent packing in said groove, and lubricant means on said cylinder in normal registry with said groove for supplying lubricant to said packing.

2. A shock absorber mounting for a vehicle bumper comprising a plunger member, means attaching the same to a supporting chassis frame member, a cylinder closed by a wall at one end telescopically mounted on said plunger, a coil spring within said cylinder bearing on said plunger and said cylinder end wall opposite thereto, a guide and adjusting bolt integral with said plunger and projecting through an opening in said cylinder end wall whereby to adjust the compression of said coil spring, said plunger being formed at its outer end with an integral wide radial seating flange, an attaching bolt formed integral with said plunger at its outer end and adapted to be inserted through an opening in said chassis frame member for rigidly clamping the seating flange of said plunger thereto to provide said plunger attaching means, and means attaching a bumper to said cylinder end wall, said cylinder end wall being provided with a pair of diametrically opposed flanges defining with said cylinder end wall a flat seat, and said bumper attaching means comprising a leaf spring member constituted by a flat intermediate portion and a pair of divergent arms, said intermediate portion seating on said cylinder end wall seat and being rigidly attached thereto by a connection with the flanges thereof, an opening in said intermediate portion in registry with the opening in said cylinder end wall through which said guide and adjusting bolt projects, and means connecting the ends of said arms to said bumper bar.

ALEXANDER SZABO.